(12) United States Patent
Moutaux et al.

(10) Patent No.: US 10,421,530 B2
(45) Date of Patent: Sep. 24, 2019

(54) DEVICE FOR CONTROLLING A PROPELLER, HAVING VARIABLE-PITCH BLADES, OF A TURBOPROP ENGINE

(71) Applicant: SAFRAN HELICOPTER ENGINES, Bordes (FR)

(72) Inventors: Antoine Moutaux, Moissy-Cramayel (FR); Jean-Michel Presse, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 93 days.

(21) Appl. No.: 15/735,554

(22) PCT Filed: Jun. 17, 2016

(86) PCT No.: PCT/FR2016/051476
§ 371 (c)(1),
(2) Date: Dec. 11, 2017

(87) PCT Pub. No.: WO2016/207522
PCT Pub. Date: Dec. 29, 2016

(65) Prior Publication Data
US 2018/0354608 A1    Dec. 13, 2018

(30) Foreign Application Priority Data
Jun. 23, 2015 (FR) .................................. 15 55734

(51) Int. Cl.
*B64C 11/38* (2006.01)
*B64C 11/30* (2006.01)
(Continued)

(52) U.S. Cl.
CPC ............ *B64C 11/38* (2013.01); *B64C 11/303* (2013.01); *F15B 9/17* (2013.01); *F15B 13/10* (2013.01); *F15B 21/08* (2013.01); *Y02T 50/66* (2013.01)

(58) Field of Classification Search
CPC .......... B64C 11/303; B64C 11/38; F15B 9/17; F15B 13/10; F15B 21/08; Y02T 50/66
See application file for complete search history.

(56) References Cited

U.S. PATENT DOCUMENTS 4,588,354 A * 5/1986 Duchesneau ........... B64C 11/38
416/27
4,893,989 A * 1/1990 Carvalho ............... B63H 3/082
416/157 R
(Continued)

FOREIGN PATENT DOCUMENTS

GB      2 144 491 A      3/1985

OTHER PUBLICATIONS

International Search Report dated Sep. 15, 2016, for International Application No. PCT/FR2016/051476, filed Jun. 17, 2016, 5 pages.
(Continued)

*Primary Examiner* — Igor Kershteyn
(74) *Attorney, Agent, or Firm* — Christensen O'Connor Johnson Kindness PLLC

(57) ABSTRACT

A device for controlling a propeller, having variable-pitch blades, of a turboprop engine, has a first hydromechanical device for controlling the pitch of the blades of the propeller and a second hydromechanical device for controlling the speed of rotation of the propeller. The device includes a single electromechanical actuator with a movable actuator member mechanically connected both to the first hydromechanical device for controlling the pitch, in order to manage the pitch setpoint, and to the second hydromechanical device
(Continued)

Figure 1:
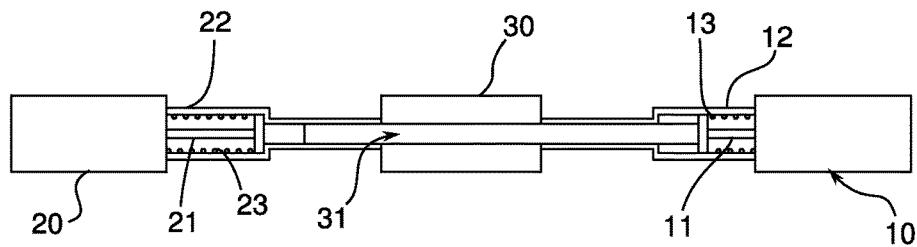

for controlling the speed, in order to manage the speed setpoint.

9 Claims, 3 Drawing Sheets

(51) Int. Cl.
*F15B 13/10* (2006.01)
*F15B 9/17* (2006.01)
*F15B 21/08* (2006.01)

(56) References Cited

U.S. PATENT DOCUMENTS

| | | | | | |
|---|---|---|---|---|---|
| 4,986,734 | A | * | 1/1991 | Layer | B64C 11/40 416/48 |
| 5,037,271 | A | * | 8/1991 | Duchesneau | B64C 11/38 416/157 R |
| 5,042,966 | A | * | 8/1991 | Schwartz | B64C 11/38 416/157 R |
| 5,141,399 | A | * | 8/1992 | Duchesneau | B64C 11/38 416/157 R |
| 5,897,293 | A | * | 4/1999 | Arel | B64C 11/303 416/114 |
| 6,059,528 | A | * | 5/2000 | Danielson | B64C 11/303 416/153 |
| 6,077,040 | A | * | 6/2000 | Pruden | B24C 11/00 416/153 |
| 6,511,292 | B2 | * | 1/2003 | Perkinson | B64C 11/40 416/157 R |
| 2007/0212221 | A1 | * | 9/2007 | Carvalho | B64C 11/303 416/46 |
| 2013/0323050 | A1 | | 12/2013 | Kleckler | |

OTHER PUBLICATIONS

Written Opinion dated Sep. 15, 2016, for International Application No. PCT/FR2016/051476, filed Jun. 17, 2016, 4 pages.
International Preliminary Report on Patentability dated Dec. 26, 2017, issued in corresponding International Application No. PCT/FR2016/051476, filed Jun. 17, 2016, 1 page.

\* cited by examiner

DEVICE FOR CONTROLLING A PROPELLER, HAVING VARIABLE-PITCH BLADES, OF A TURBOPROP ENGINE

1. TECHNICAL FIELD OF THE INVENTION

The invention relates to a device for controlling a propeller of a turboprop engine. The invention relates in particular to a device for controlling a propeller having variable-pitch blades, i.e. a propeller of which the blades can be pivoted about their axis.

2. TECHNICAL BACKGROUND

A turboprop engine is a propulsion means that is used in particular on certain aircraft, and comprises a gas turbine and a propeller. The propellers of most turboprop engines nowadays are propellers comprising variable-pitch blades. These are also referred to as variable-pitch propellers. A propeller having variable-pitch blades is equipped with a mechanism allowing the pitch angle of the blades to be adjusted, i.e. the angle between the reference chord of a blade and its rotational plane. Controlling the pitch angle of the blades makes it possible to adjust the properties of the propeller so as to optimise the performance of the turboprop engine within a large flight envelope. For example, for the take-off and climbing phases of the aircraft, the aim is generally to provide a significant pitch so as to maintain a reasonable propeller speed at high levels of power. For cruising flight phases, the aim is generally to provide a lower pitch in order to maintain a reasonable propeller speed at lower levels of power. During landing, the aim is generally to provide a negative pitch in order to decelerate the aircraft and reduce its braking distance. It is therefore necessary to provide a control device that allows the pitch of the blades of a propeller to be modified during flight.

As a general rule, propellers comprising variable-pitch blades are controlled in two operating modes, depending on the flight phases of the aircraft. For low engine speeds, the pitch of the propeller is controlled directly. Throughout the text, this mode is referred to as the "beta mode". For higher engine speeds, the speed of the propeller is controlled to an optimal operating point. Throughout the text, this mode is referred to as the "speed mode".

It is therefore necessary to provide both a control system for the beta mode which slaves the pitch to a pitch setpoint, and a control system for the speed mode which slaves the propeller speed to a speed setpoint. These pitch and speed setpoints are either fixed or are provided by means of exterior mechanical cables or electrical signals.

Currently, there are three distinct groups of systems for controlling a propeller: electrical control, electro-hydraulic control by servo valves and hydromechanical control.

In practice, electrical control and control by servo valves cannot be used for all applications, either because of the total weight of the system (this is the case in particular for control by servo valves), the costs incurred (this is the case in particular for electrical control or control by servo valves) or because they are not advanced enough (this is the case in particular for electrical control).

The principle of hydromechanical control is to apply oil pressure to a piston rigidly connected to a mechanism that drives the blades in rotation about their axis. The piston is for example housed in a cylinder in the propeller hub, and defines one or two pressure chambers. Reference is made to a double-action propeller when the pressure can be exerted from either side of the piston. Reference is made to a single-action propeller when the pressure can only be exerted from one side of the piston. In this case, the piston is returned by means of a spring and balance weights arranged at the root of each blade.

A device for controlling a propeller having variable-pitch blades comprises, in a known manner, a first piece of hydromechanical equipment for slaving the pitch of the blades of the propeller to a pitch setpoint, and a second piece of hydromechanical equipment for slaving the rotational speed of the propeller to a speed setpoint.

The first piece of hydromechanical equipment for slaving the pitch generally uses a slide actuated both by the propeller (which makes it possible to obtain a copy of the angle of the blades) and a mechanical connecting link actuated by the pilot in order to provide the pitch setpoint.

The second piece of hydromechanical equipment for slaving the speed uses a speed controller based on rotating balance weights.

Therefore, in speed mode, the rotating balance weight system, which is rotated by the engine reduction gear at a speed proportional to that of the propeller, drives a slide which controls the piston of the propeller, and therefore its pitch, either directly or by means of a hydraulic amplifier. The calibration of the return spring of the balance weights defines the speed setpoint. This speed setpoint can be modified, for example by adjusting the calibration of the spring by means of a mechanical cable or an all-or-nothing electrovalve. In beta mode, the hydraulic slides that are mechanically connected to the pitch setpoint and the pitch copy make it possible to slave the pitch to the intended setpoint. The pitch setpoint is mechanically transmitted to the slide by the mechanical connecting link controlled from the cockpit.

This solution has two drawbacks. First, the control of the speed setpoint by action on the return spring is either binary (2 selectable speeds) or is implemented by a mechanical connecting link that does not allow control by means of an electronic device such as an engine control computer. Second, the pitch setpoint is controlled by a mechanical connecting link connected to the cockpit controls, and therefore does not allow the pitch to be directly controlled by means of an electronic control computer.

The inventors have therefore sought to improve the principle of hydromechanical control of a propeller having variable-pitch blades.

3. AIMS OF THE INVENTION

The object of the invention is to overcome at least some of the disadvantages of known devices for controlling a propeller having variable-pitch blades.

In particular, in at least one embodiment of the invention, the object of the invention is also to provide a device for controlling a propeller having variable-pitch blades which no longer requires mechanical connecting links connected to the cockpit in order to control the propeller in beta mode.

In at least one embodiment of the invention, the object of the invention is also to provide a device that allows an electrical interface with an electronic control computer.

In at least one embodiment of the invention, the object of the invention is also to provide a device that weighs less and costs less than prior-art control devices.

4. DESCRIPTION OF THE INVENTION

For this purpose, the invention relates to a device for controlling a propeller, having variable-pitch blades, of an aircraft engine, for example a turboprop engine or open rotor engine, comprising a first piece of hydromechanical equipment for slaving the pitch of the blades of the propeller to a pitch setpoint, and a second piece of hydromechanical equipment for slaving the rotational speed of the propeller to a speed setpoint.

The device for controlling a propeller according to the invention is characterised in that it further comprises a single electromechanical actuator comprising a movable actuating member mechanically connected both to said first piece of hydromechanical equipment for slaving the pitch, in order to control the pitch setpoint, and to said second piece of hydromechanical equipment for slaving the speed, in order to control the speed setpoint.

A control device according to the invention therefore comprises a single electromechanical actuator that makes it possible to control both the speed setpoint and the pitch setpoint. This control is carried out by means of a movable actuating member that is mechanically connected both to the first piece of hydromechanical equipment and to the second piece of hydromechanical equipment. It is possible to use a single actuator because the inventors have realised that the speed mode and the beta mode are not used in the same flight phases. Using a single electromechanical actuator, it is therefore possible to control both the speed setpoint in the corresponding flight phases and the pitch setpoint in the corresponding flight phases. An electromechanical actuator is also designed to receive electrical commands and to actuate a movable actuating member as a result. Therefore, a control device according to the invention makes it possible to use a single electrical command to control the pitch setpoint and the speed setpoint. In other words, a device according to the invention means that it is no longer necessary to provide mechanical cables in the cockpit because the beta mode and the speed mode are directly controlled by an electrical command provided to the electromechanical actuator. Using the invention, it is also possible to only provide a single interface for controlling the two operating modes of the propeller.

Advantageously and according to the invention, the movable actuating member of said electromechanical actuator is designed to move within at least one first range of positions in which it actuates said first piece of hydromechanical equipment to determine a pitch setpoint, and within at least one second range of positions in which it actuates said second piece of hydromechanical equipment to determine a speed setpoint.

According to a first variant of the invention, these two ranges of positions are separate from one another such that, within the first range of positions, the movable actuating member determines the pitch setpoint and keeps the speed setpoint constant; within the second range of positions, the movable actuating member determines the speed setpoint and keeps the pitch setpoint constant.

In other words, according to this variant, the movable actuating member is designed to maintain a constant speed setpoint on said second piece of equipment when it is within said first range of positions, and to maintain a constant pitch setpoint on said first piece of equipment when it is within said second range of positions.

According to another variant, the two ranges of positions are interlinked such that, whatever the position, the movable actuating member acts both on the speed setpoint and on the pitch setpoint.

Advantageously and according to the invention, the movable actuating member is designed to move within at least one third range of positions, referred to as a neutral range, in which it does not exert any notable action on either of the two pieces of hydromechanical equipment.

According to this variant, the movable actuating member can be moved within a neutral range in which it does not have a notable effect on the speed setpoint and pitch setpoint.

Advantageously and according to the invention, the second piece of hydromechanical equipment comprises a hydraulic slide that is designed to hydraulically control the propeller pitch and is connected to balance weights designed to be driven mechanically at a speed proportional to that of the propeller, and a return spring of said balance weights, and the movable actuating member of the electromechanical actuator is designed to act on the stress of said return spring of the balance weights. This action on the stress of the return spring of the balance weights allows the speed setpoint to be modulated.

Advantageously and according to the invention, the first piece of hydromechanical equipment comprises at least one hydraulic slide that is designed to hydraulically control the propeller pitch and is driven mechanically by a connecting link connected to a copy of the pitch of the propeller, and said movable actuating member of said electromechanical actuator is designed to act on said hydraulic slide in order to modulate the pitch setpoint of the propeller.

Advantageously and according to the invention, the movable actuating member mechanically connected to said first and second pieces of hydromechanical equipment comprises at least one cam having a profile that determines an actuating law of the first and second pieces of hydromechanical equipment depending on an angular position of each cam.

Advantageously and according to the invention, said electromechanical actuator is selected from the group comprising a stepper motor, a direct current motor or a single-track or redundant torque motor.

The invention also relates to an aircraft engine of the turboprop or open rotor type, or more generally equipped with variable-pitch blades, which is equipped with a control device according to the invention.

The invention also relates to a control device and to an aircraft engine equipped with a control device of this type, which are characterised in combination by some or all of the features described previously or hereinafter.

5. LIST OF FIGURES

Figure 2:
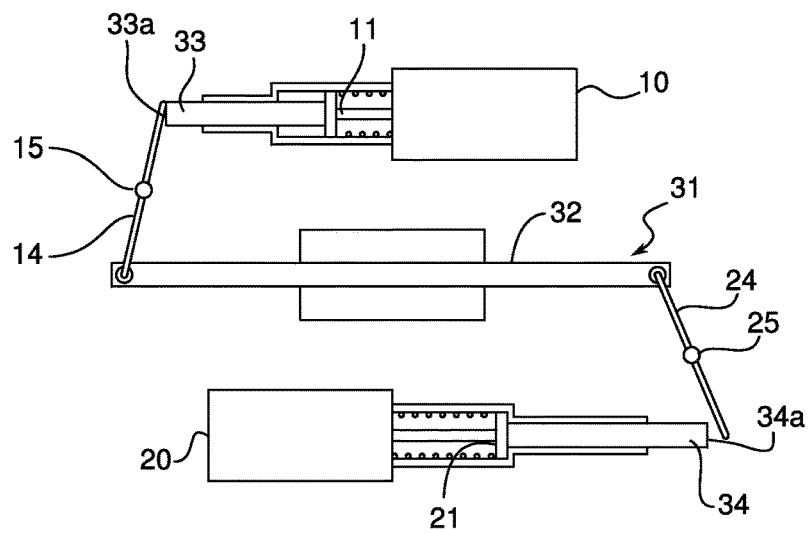
Figure 3:
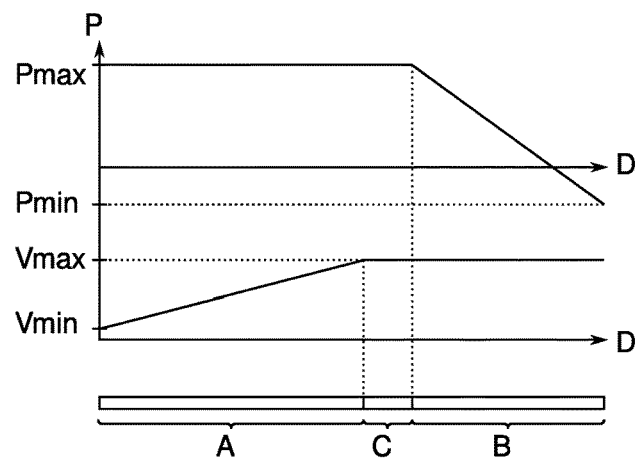
Figure 4A:
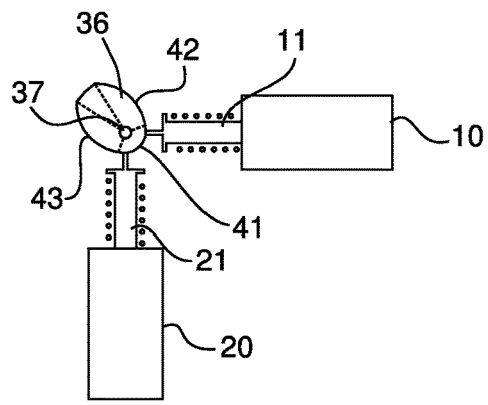
Figure 4B:
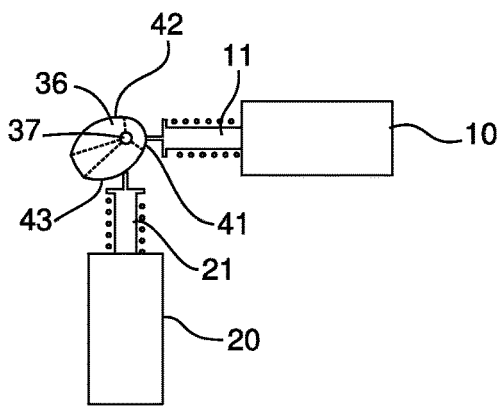
Figure 4C:
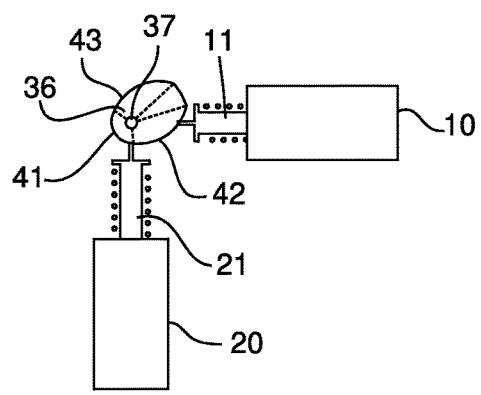
Figure 5:
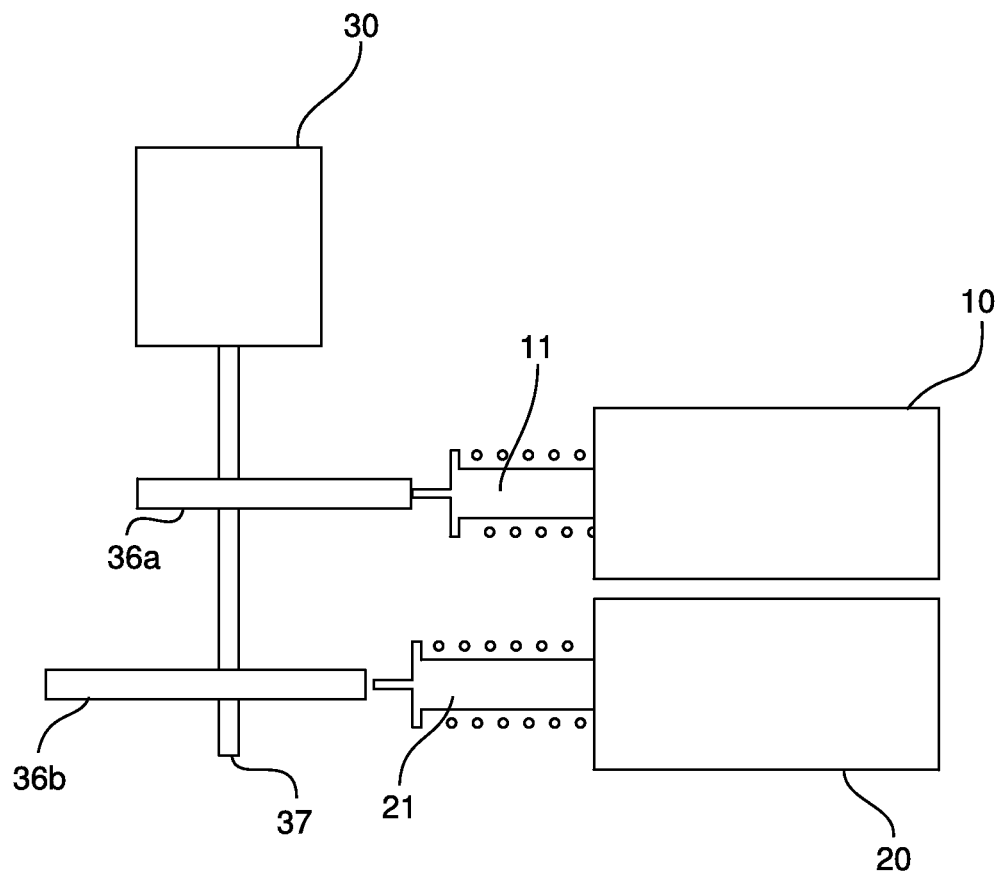

Other aims, features and advantages of the invention will become apparent from reading the following description, which is provided purely on a non-limiting basis and relates to the accompanying figures, in which:

FIG. 1 is a schematic view of the operating principle of a control device according to the invention, FIG. 2 is a schematic view of a control device according to an embodiment of the invention, using a linear electromechanical actuator, FIG. 3 is a schematic view of the variation curves of the setpoints as a function of the position of the movable actuating member of a control device according to an embodiment of the invention, FIGS. 4*a*, 4*b* and 4*c* are schematic views of a control device according to another embodiment of the invention, using a rotating electromechanical actuator, in different operating modes, FIG. 5 is a schematic view of a control device according to another embodiment of the invention, using a rotating electromechanical actuator comprising two separate cams.

6. DETAILED DESCRIPTION OF AN EMBODIMENT OF THE INVENTION

In the drawings, the scales and proportions are not strictly respected for the sake of illustration and clarity. Throughout the following description with reference to the drawings, identical, similar or analogous elements are denoted by the same reference signs.

According to the invention, a device for controlling a propeller, having variable-pitch blades, of a turboprop engine comprises a first piece of hydromechanical equipment for slaving the pitch of the blades of the propeller, referred to hereinafter by the expression "first piece of equipment" and provided with reference sign 10 in the drawings. The control device also comprises a second piece of hydromechanical equipment for slaving the rotational speed of the propeller, referred to hereinafter by the expression "second piece of equipment" and provided with reference sign 20 in the drawings.

The first and second pieces of equipment are not described in detail because the invention essentially lies in the control means for these pieces of equipment and not in the pieces of equipment themselves, which are moreover known by a person skilled in the art. Moreover, these first and second pieces of equipment may use shared means, such as slides, pistons, balance weights, etc., even if they are shown in the drawings as two separate pieces of equipment for the sake of illustration and clarity.

The first piece of equipment 10 and the second piece of equipment 20 are designed to act hydromechanically on the pitch of the propellers, and to act indirectly on the speed of the propeller.

A device according to the invention further comprises an electromechanical actuator 30 comprising a movable actuating member 31 mechanically connected both to the first piece of equipment 10 and to the second piece of equipment 20.

According to the embodiment shown in FIGS. 1 and 2, the actuator 30 is a linear actuator.

According to the embodiment in FIG. 1, the movable actuating member 31 is a movable rod. This movable rod may be moved in order to actuate either the first piece of equipment 10, for example by means of a piston 11 housed in a cylinder 12 and stressed by a spring 13, or the second piece of equipment 20, for example by means of a piston 21 housed in a cylinder 22 and stressed by a spring 23. According to a particular embodiment, the piston 11 and 21, the cylinder 12 and 22 and the spring 13 and 23 may be housed in the pieces of equipment 10 and 20.

According to another embodiment, as shown in FIG. 2, the movable actuating member 31 is formed by a first rod 32 that is directly actuated by an electrical command received by the actuator and by two rods 33, 34 connected to the pistons 11, 21, respectively, by means of connecting rods 14, 24 that are mounted so as to pivot about respective pivot pins 15, 25. Therefore, the movement of the movable rod 32 results, in the movement direction of said rod, in either adjustment of the pitch setpoint or adjustment of the speed setpoint by means of the connecting rods 14, 24 of the rods 33, 34 and of the pivot pins 15, 25. For example, if the rod 32 is moved to the left in FIG. 2, the connecting rod 14 pivots about the pivot pin 15 such that its upper end comes into mechanical contact with the end 33a of the rod 33 and therefore moves the piston 11, which is rigidly connected to the rod 33, thus allowing the pitch setpoint to be adjusted. For example, if the rod 32 is moved to the right in FIG. 2, the connecting rod 24 pivots about the pivot pin 25 such that its lower end comes into mechanical contact with the end 34a of the rod 34 and therefore moves the piston 21, which is rigidly connected to the rod 34, thus allowing the speed setpoint to be adjusted.

The configurations in FIGS. 1 and 2 make it possible to form a first range A of positions in which the movable actuating member 31 actuates the first piece of hydromechanical equipment 10 in order to determine a pitch setpoint, and a second range B of positions in which the movable actuating member 31 actuates the second piece of hydromechanical equipment 20.

In FIG. 1, the actuating member 31 is in a position in the range A of positions. Indeed, it is noted that the actuating member 31 is in contact with the piston 11, and acts directly on the piston such that it acts on the command for the pitch of the propeller. If the actuating member 31 were actuated towards the piston 21, the member would be in a position in the second range B of positions in which it actuates said second piece of hydromechanical equipment 20 in order to determine a speed setpoint.

It is also noted that the configuration in FIG. 1 makes it possible to form a range C of positions in which the actuating member 31 does not act on either of the two pistons 11 or 21, such that neither the pitch nor the speed is controlled in this neutral zone.

FIG. 3 is a schematic view in which the different ranges A, B and C thus defined are shown in relation to the course D of the movable actuating member 31 and the associated speed setpoint V and pitch setpoint P. The speed setpoint V and pitch setpoint P are between the extreme values Vmax and Vmin, and Pmax and Pmin, respectively, over the course D of the movable actuating member.

According to another embodiment as shown in FIGS. 4a, 4b and 4c, the movable actuating member comprises a cam 36 having a profile that determines an actuating law of the first and second pieces of hydromechanical equipment depending on an angular position of the cam 36. Said cam 36 is mounted so as to pivot about a shaft 37. Furthermore, the cam 36 has a profile divided into three main sectors, of which one sector 41 is in the shape of an arc of a circle, referred to as the constant sector, one sector 43 is non-circular and referred to as the speed sector, and one sector 42 is non-circular and referred to as the pitch sector. The sectors 42, 43 form control sectors. Furthermore, the two pistons 11, 21 of the first and second pieces of equipment are arranged so as to be in contact with the cam 36. Depending on the angular position of the cam, each piston can be moved by one or the other of the sectors of the profile of the cam.

When the cam is pivoted about the shaft 37 in order to bring the sector 41 in the shape of an arc of a circle into abutment with a piston of the first or the second piece of equipment, this piece of equipment is kept in a constant position. Indeed, while the cam keeps the sector 41 in contact with the piston, the distance separating the shaft 37 from the end of the profile facing the piston remains constant. The compression of the piston facing the cam therefore remains constant. In other words, while the piston remains in contact with this sector in the shape of an arc of a circle, the position thereof does not change. Therefore, this is indeed a constant sector for the command. This sector may have an angular range that is greater than the angle formed by the two pistons (here 90°) so as to generate an angular range within which the movement of the actuator has no effect on either the position setpoint or the pitch setpoint. This is the above-mentioned neutral zone.

By contrast, when the cam is pivoted about the shaft 37 in order to cause a control sector 42, 43 to face a piston and to be in contact therewith, any rotation of the cam results in a translational movement of this facing piston. Indeed, the distance separating the shaft 37 from the end of the profile facing a piston changes, given that the profile is no longer circular.

In FIG. 4*a*, the cam 36 is oriented such that each piston is in contact with the sector 41. This is the neutral zone of the actuator, which does not act on either the speed or the pitch of the propeller.

In FIG. 4*b*, the cam 36 is oriented such that the speed sector 43 is in contact with the piston 21 of the second piece of equipment 20. Therefore, across this entire range of positions, the cam 36 determines a speed setpoint. When the sector 43 is facing the piston 21 of the piece of equipment 20, the constant sector 41 is facing the piston 11 of the piece of equipment 10, such that the pitch setpoint is not affected by the rotation of the cam over this entire sector.

In FIG. 4*c*, the cam 36 is oriented such that the speed sector 42 is in contact with the piston 11 of the first piece of equipment 10. Therefore, across this entire range of positions, the cam 36 determines a pitch setpoint. When the sector 42 is facing the piston 11 of the piece of equipment 10, the constant sector 41 is facing the piston 21 of the piece of equipment 20, such that the speed setpoint is not affected by the rotation of the cam over this entire sector.

According to an advantageous variant of this embodiment, the electromechanical actuator drives two separate cams, each cam being designed to act on just one setpoint.

For example, and as shown in FIG. 5, the actuator comprises a first cam 36*a* designed to act on a pitch setpoint, and a second cam 36*b* designed to act on a speed setpoint. In FIG. 5, the cams are shown from the side for the sake of illustration and clarity. Each cam has a specific profile which determines the control law of the setpoint that it can control.

The invention is not restricted only to the described embodiments. In particular, according to the embodiment in FIGS. 4*a*, 4*b* and 4*c*, the sectors 42 and 43 have identical profiles. That said, according to other embodiments, each speed sector and pitch sector may have a different profile in order to determine a specific control law. Therefore, it is possible to adapt the control laws depending on the specific requirements linked to the type of propeller for which the control device is intended.

The invention claimed is:

1. A device for controlling a propeller, having variable-pitch blades, of an aircraft engine, the device comprising a first piece of hydromechanical equipment configured to slave the pitch of the blades of the propeller to a pitch setpoint, and a second piece of hydromechanical equipment configured to slave the rotational speed of the propeller to a speed setpoint,
wherein the device comprises a single electromechanical actuator comprising a movable actuating member mechanically connected both to said first piece of hydromechanical equipment to control the pitch setpoint, and to said second piece of hydromechanical equipment to control the speed setpoint.

2. The device according to claim 1, wherein said movable actuating member of said electromechanical actuator is configured to move within at least one first range of positions in which the electromechanical acutator actuates said first piece of hydromechanical equipment to determine a pitch setpoint, and within at least one second range of positions in which the electromechanical acutator actuates said second piece of hydromechanical equipment to determine a speed setpoint.

3. The device according to claim 2, wherein said movable actuating member is configured to maintain a constant speed setpoint on said second piece of equipment when the electromechanical acutator is within said first range of positions, and to maintain a constant pitch setpoint on said first piece of equipment when it is within said second range of positions.

4. The device according to claim 2, wherein said movable actuating member is configured to move within at least one third range of positions, referred to as a neutral range, in which configured does not exert any notable action on either of the two pieces of hydromechanical equipment.

5. The device according to claim 1, wherein said second piece of hydromechanical equipment comprises a hydraulic slide configured to hydraulically control the propeller pitch and is connected to balance weights configured to be driven mechanically at a speed proportional to that of the propeller, and a return spring of said balance weights, where said movable actuating member of said electromechanical actuator is configured to act on a stress of said return spring of the balance weights.

6. The device according to claim 1, wherein said first piece of hydromechanical equipment comprises at least one hydraulic slide that hydraulically controls the propeller pitch and is driven mechanically by a connecting link connected to a copy of the pitch of the propeller, wherein said movable actuating member of said electromechanical actuator is configured to actuate said hydraulic slide.

7. The device according to claim 1, wherein said movable actuating member mechanically connected to said first and second pieces of hydromechanical equipment comprises at least one cam having a profile that determines an actuating law of the first and second pieces of hydromechanical equipment depending on an angular position of each cam.

8. The device according to claim 1, wherein said electromechanical actuator is selected from the group consisting of a stepper motor, a direct current motor and a single-track or redundant torque motor.

9. An aircraft engine equipped with variable-pitch blades, the aircraft engine comprising the device according to claim 1.

* * * * *

UNITED STATES PATENT AND TRADEMARK OFFICE
CERTIFICATE OF CORRECTION

PATENT NO. : 10,421,530 B2
APPLICATION NO. : 15/735554
DATED : September 24, 2019
INVENTOR(S) : A. Moutaux et al.

Page 1 of 1

It is certified that error appears in the above-identified patent and that said Letters Patent is hereby corrected as shown below:

In the Claims

| Column | Line | |
|---|---|---|
| 8 (Claim 2, Line 4) | 7 | "actutator" should read --actuator-- |
| 8 (Claim 2, Line 7) | 10 | "actutator" should read --actuator-- |
| 8 (Claim 3, Line 4) | 16 | "actutator" should read --actuator-- |

Signed and Sealed this
Twenty-eighth Day of April, 2020

Andrei Iancu
*Director of the United States Patent and Trademark Office*